United States Patent
Reed et al.

(10) Patent No.: US 6,843,940 B2
(45) Date of Patent: Jan. 18, 2005

(54) METHOD AND MOLD FOR MOLDING PLASTIC LENSES

(75) Inventors: James A. Reed, Clearwater, FL (US); Joseph Boryslawski, St. Petersburg, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 338 days.

(21) Appl. No.: 10/212,629

(22) Filed: Aug. 5, 2002

(65) Prior Publication Data

US 2004/0021238 A1 Feb. 5, 2004

(51) Int. Cl.[7] ............................................. B29D 11/00
(52) U.S. Cl. .................... 264/2.2; 264/2.5; 425/808; 425/812
(58) Field of Search ............................ 264/1.1, 2.2, 2.5, 264/313; 425/808, 812

(56) References Cited

U.S. PATENT DOCUMENTS

| 5,110,514 A | 5/1992 | Soane | 264/22 |
|---|---|---|---|
| 5,547,618 A | 8/1996 | Magne | 264/1.36 |
| 5,662,839 A | 9/1997 | Magne | 264/1.38 |
| 5,973,098 A | 10/1999 | Keita et al. | 528/65 |
| 5,989,698 A | 11/1999 | Mrozinski et al. | 428/315.7 |
| 6,183,853 B1 | 2/2001 | Exsted | 428/308.4 |
| 6,416,689 B1 | 7/2002 | Keita et al. | 264/1.1 |
| 2002/0047220 A1 | 4/2002 | Su | 264/2.2 |

FOREIGN PATENT DOCUMENTS

| DE | 199 50 703 | * 4/2001 |
| EP | 081 655 | * 6/1983 |

* cited by examiner

*Primary Examiner*—Mathieu D. Vargot
(74) *Attorney, Agent, or Firm*—Fulbright & Jaworski L.L.P.

(57) ABSTRACT

A method for making an organic glass lens or lens blank which comprises providing a two-piece mold defining a molding cavity having a vertical axis which is part of a fixed reference system comprising said vertical axis and a horizontal axis which intersects at the center of the mold, a liquid tight annular closure member disposed at the periphery of the mold pieces for maintaining the two mold pieces and closing the molding cavity, wherein the annular closure member comprises at least a portion thereof made of a material that is initially gas permeable but becomes gas impermeable when in contact with a liquid polymerizable composition.

8 Claims, 2 Drawing Sheets

METHOD AND MOLD FOR MOLDING PLASTIC LENSES

BACKGROUND OF THE INVENTION

1. Field of the Invention

The present invention concerns molding optical lenses, in particular ophthalmic lenses, from a polymerizable synthetic composition.

2. Description of the Prior art

The traditional mold comprises two pieces, typically made of mineral glasses, at the periphery of which is disposed an annular closure member, such as a gasket or an adhesive tape, defining with them the required molding cavity.

The conventional way to fill a two-piece mold as above is by causing the molding material to flow into the molding cavity through a casting opening provided for this purpose in the closure member.

In at least partly automated process, the mold to be filled is vertically aligned with a filling device adapted to deliver a particular quantity of molding material through a nozzle.

One possibility with such a vertically oriented mold is to fill the molding cavity by gravity only through a nozzle disposed on the top of the mold periphery. See for example U.S. Pat. No. 5,110,514.

Experience has shown that unless special measures are implemented, for example a relatively long waiting time (in the order of two hours, for example) between filling the mold and starting polymerization, the optical lenses obtained frequently have localized optical defects of greater or lesser severity, leading to relatively high reject rates.

To overcome the above problems, U.S. Pat. Nos. 5,547,618 and 5,662,839 propose filling the molding cavity of a two-piece mold vertically oriented through a casting opening formed in a lower part of the closure member and using pumping means adapted to cause the molding material to flow without significantly pressurizing it.

Typically, filling of the molding cavity is effected using a pipe connected to a pressurized molding material reservoir and applied, like a filling nozzle, to the casting opening.

The annular closure member, for example an adhesive tape, must not only fixedly maintain the two pieces of the mold in the required relative positions but also provide a leak-proof seal with regard to the liquid polymerizable material for avoiding leakage of the material of the periphery of the mold.

Conventional adhesive tapes used to form the annular closure members are generally impervious both to the liquid polymerizable material and gases.

During the filling of the molding cavity with the liquid polymerizable material, over filling of the molding cavity shall be avoided in order not to deteriorate adhesion of the peripheral adhesive tape while gases shall be evacuated from the mold cavity and entrapping of gas bubbles within the liquid polymerizable material shall be avoided as much as possible.

Thus, when using a conventional peripheral adhesive tape as the annular closure, an opening must be provided in an upper position of the tape to allow venting of the gases. This venting opening is typically formed by punching the adhesive tape with a needle.

One of the main problems is to evacuate the remaining gas from the mold without leakages of excess monomer by the venting opening. In particular, when using a bottom filled mold, it is difficult to vent out the last air bubble which is usually entrapped at the top of the molding cavity, just beneath the punctured portion of the adhesive tape. This is particularly the case when molding negative power glasses.

SUMMARY OF THE INVENTION

Therefore, the aim of the invention is to provide a method for molding an organic lens or lens blank, in particular an organic ophthalmic lens or lens blank which overcomes the prior art problems and specifically allows venting out of gases and in particular of the last air bubbles at the top of the molding cavity without risks of leakage of the liquid polymerizable composition.

A further object of the invention is to provide a two-piece mold for implementing the method according to the invention.

According to the invention, there is provided a method for making an organic glass lens or lens blank which comprises:

providing a two-piece mold defining a molding cavity having a vertical axis which is part of a fixed reference system comprising said vertical axis and a horizontal axis which intersects at the center of the mold, a liquid tight annular closure member disposed at the periphery of the mold pieces for maintaining the two mold pieces and closing the molding cavity;

filling the molding cavity from the bottom thereof with a liquid polymerizable composition;

evacuating outwardly the gas initially contained in the molding cavity;

polymerizing the liquid polymerizable composition; and disassembling the mold and recovering the molded lens or lens blank;

wherein the annular closure member comprises at the top of the molding cavity (with regard to the fixed reference system) at least a portion made of a material that is normally gas permeable, typically air permeable but becomes gas impermeable when contacted by the liquid polymerizable composition.

In a preferred embodiment, the molding cavity is almost totally filled with the composition but leaving a gas bubble at the top of the molding cavity between the annular closure member and the liquid polymerizable composition. Then, one applies a force either on the mold or the annular closure member to increase pressure inside the molding cavity and evacuate the gas bubble from the molding cavity through the initially gas permeable portion of the annular closure member, until said portion contacts the liquid polymerizable composition and becomes gas impermeable.

More preferably, the force is locally applied on the annular closure member around the initially gas permeable portion.

Even better, the force is applied by a plunger shaped to provide a contact between the plunger and the annular closure member at the periphery of the initially gas permeable portion.

Preferably, the plunger has a head which is U-shaped.

Preferably, the air permeable portion has a porosity such that it can sustain an air flow ranging from 0.5 to 400 $cm^3 \cdot cm^{-2} \cdot s^{-1}$, preferably 5 to 40 $cm^3 \cdot cm^{-2} \cdot s^{-1}$ (volume of air passing through 1 $cm^2$ of air permeable portion during one second).

In a most preferred embodiment, the annular closure means comprises a classical liquid and air impermeable adhesive tape covering the periphery of the mold except a short top section thereof which is covered by an adhesive tape portion which is normally gas permeable, typically air permeable but becomes gas impermeable when contacted by a liquid such as the liquid polymerizable composition used for making optical lenses or lens blanks and in particular ophthalmic lenses or lens blanks.

As indicated above, the gas permeable means is preferably an adhesive tape. Such adhesive tapes are known by themselves and are coated porous materials exhibiting gas, typically air, permeability and are disclosed in U.S. Pat. Nos. 5,989,698 and 6,183,853.

A suitable adhesive tape exhibiting air permeability and repellency to liquids is also commercialized by 3M Company under the denomination "VENT TAPE®".

When using an annular closure means comprising a classical liquid and gas impermeable adhesive tape having a top opening, the opening is typically a slot having a length ranging from 2 to 15 mm (depending on the thickness of the lens) and a width ranging from 0.1 to 5 mm.

Of course, then the gas permeable, adhesive tape portion is sized to entirely tightly cover the opening and allow its adhesion to the mold parts. The liquid and gas tight adhesive tape can be any classical adhesive tape commonly used in the technical field.

The liquid polymerizable composition may be any classical composition used for making optical and ophthalmic lenses or lens blanks, but is preferably a room temperature polymerizable or curable composition.

Preferred liquid polymerizable compositions are disclosed in U.S. Pat. No. 5,973,098 which is incorporated by reference. Briefly, these compositions comprise (a) at least one polyiso(thio)cyanate monomer, and at least one polythiol monomer; or at least one episulfide and optionally one or more compounds having two or more functional groups capable of reacting with episulfide groups; and (b) a polymerization catalyst, wherein the polymerization catalyst comprises an effective amount of a least one salt of formula:

$$M_m^{p+} Y_n^-$$

wherein $M^{P+}$ is a cation selected from the group consisting of alkaline metals, alkaline earth metals, transitions metals and ammonium groups of formula $NR^+_4$ in which R is an alkyl radical, $Y^-$ is an anion such as the corresponding acid YH has a pKa fulfilling the condition $0.5 \leq pKa \leq 14$ with the proviso that when the polymerizable compositions comprise an episulfide compound and $M^{P+}$ is an ammonium group, the polymerizable composition also comprises an electro-donor compound, p is the valency of the cation, and n=mxp.

As previously indicated, the molding cavity which is vertically oriented is filled from the bottom with the liquid polymerizable composition.

Bottom filling of the molding cavity can be effected using any classical filling means. For example, filling is effected through the use of a check valve and in particular a duck bill valve. An embodiment of a duck bill valve is disclosed in EP 0.998.951. Other duck bill valves are commercialized by Vemay Laboratories.

After curing and demolding, the check valve remains imprisoned with the polymerized material. The recovered lens blank is then trimmed to eliminate the valve in order to obtain a finished lens.

BRIEF DESCRIPTION OF THE DRAWINGS

The foregoing and other objects, features and advantages of the present invention will become readily apparent to those skilled in the art from reading of the detailed description hereafter when considered in conjunction with the accompanying drawings wherein.

DESCRIPTION OF THE PREFERRED EMBODIMENT

Figure 1:
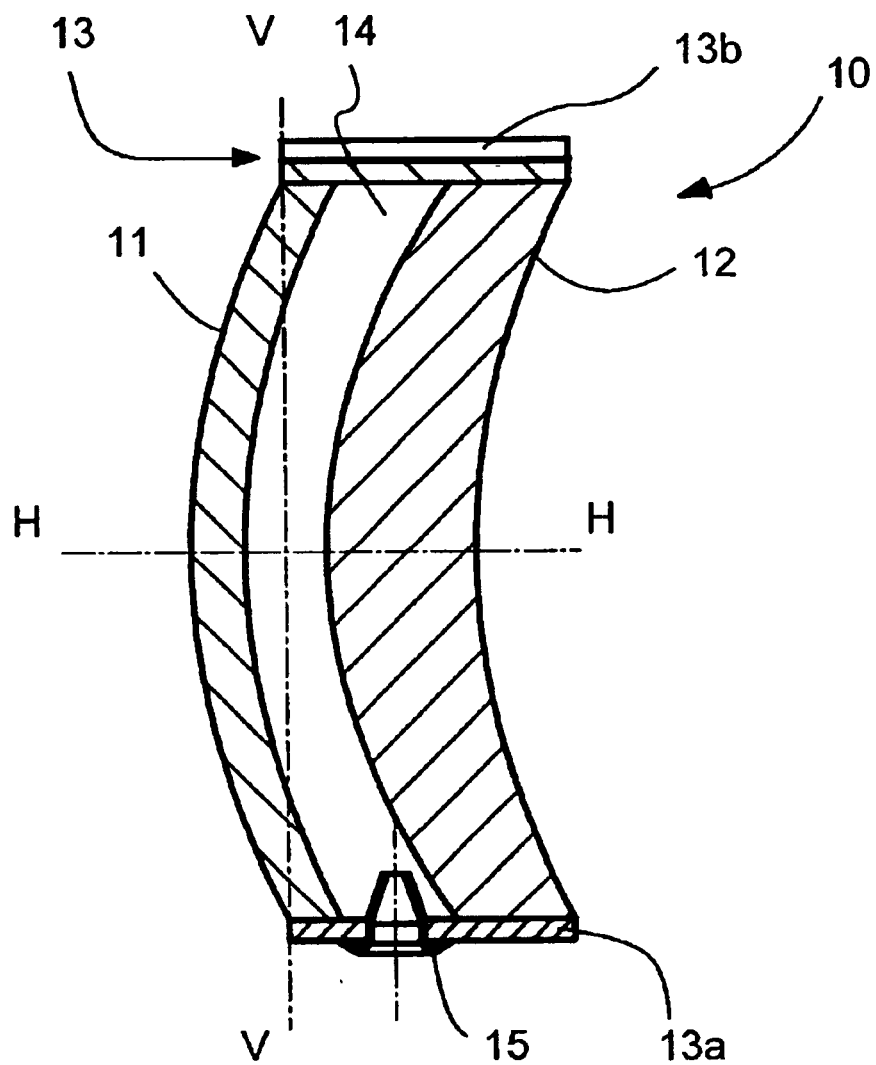
FIG. 1 is a cross-sectional schematic view of a two-piece mold for implementation of the method according to the invention.

As shown in FIG. 1, there is represented in cross-section a view of a two-piece mold 10 according to the invention.

The two-piece mold 10 comprises a front piece 11 and a back piece 12, preferably made of mineral glass, and an annular closure member 13, such as a classical adhesive tape, disposed at the periphery of the two-piece 11, 12.

The two pieces 11, 12 and the annular closure member 13 define together a molding cavity 14 which, as represented in FIG. 1, is intended for molding an ophthalmic lens.

Classical adhesive tape 13a which is gas, typically air, and liquid impermeable is adhered to the periphery of mold parts 11, 12 and covers the periphery of the molding cavity 14 except a small portion at the top of the molding cavity 14. Closure member 13 further comprises a portion 13b covering the small portion at the top of the molding cavity 14.

Portion 13b is made of a material that is normally gas, typically air, permeable but becomes gas impermeable when contacted with the liquid polymerizable composition used for making the lens or lens blank. Preferably, portion 13a (see FIG. 2A) is made of an adhesive tape such as a vent tape covering the opening and adhering to the periphery of the mold parts 11, 12 and/or adhesive tape 13a.

The molding cavity 14 comprises an upper half and a lower half symetrically arranged with regard to a central horizontal axis HH of the mold 10, the mold being held vertically or on the edge, i.e. with the molding cavity extending in the direction of a vertical axis perpendicular to the central horizontal axis HH.

A check valve 15, in the embodiment of FIG. 1 a duck bill valve, is arranged in an opening managed in the lower or bottom part of closure member 13 in order to establish flow communication from the outside of the mold 10 into the molding cavity 14.

Figure 2A:
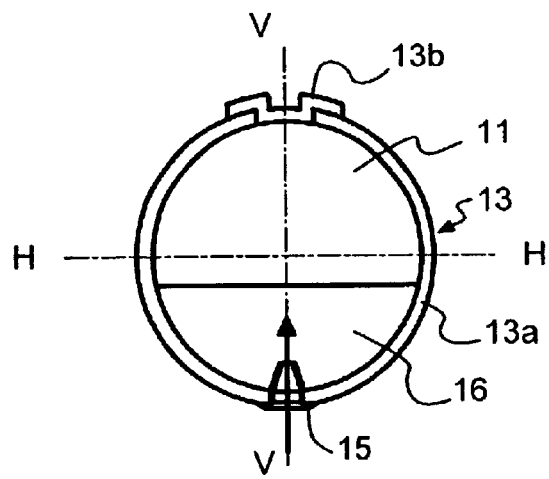
FIGS. 2A to 2C are schematic views of the main steps of the method according to the invention.

As shown in FIG. 2A, liquid polymerizable composition 16 is introduced into molding cavity through duck bill valve 15.

In use, duck bill valve 15 is connected through a pipe (not shown) to a pressurized reservoir (not shown) containing the polymerizable composition. A dosing valve (not shown) may be connected between the pressurized reservoir and the pipe to control the delivery of polymerizable composition to the duck bill valve 15.

As it is well known, the duck bill valve 15 is initially closed and opens under the slight pressure exerted by the composition 16 delivered from the reservoir, thus filling the molding cavity 14.

Figure 2B:
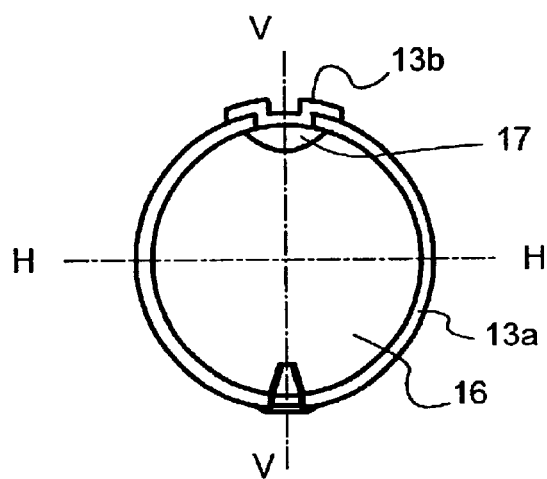

As shown in FIG. 2B, molding cavity 14 is filled up with composition 16 until only a small gas (typically air) bubble 17 remains at the top of the molding cavity 14, just beneath the gas permeable portion 13b of closure member 13.

Figure 2C:
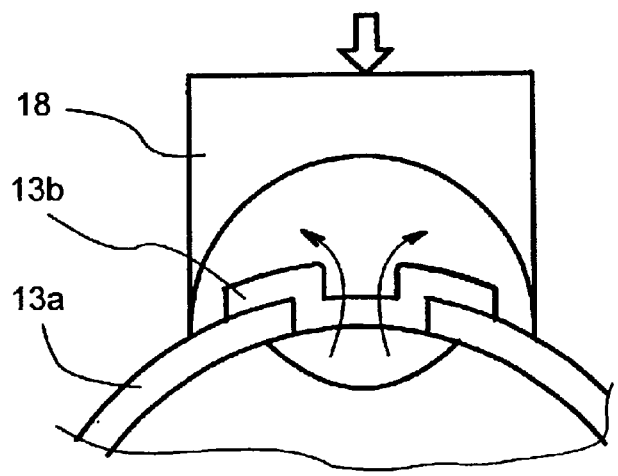

As shown in FIG. 2C, a U-shaped plunger 18 is then pushed against closure member 13 and especially against adhesive tape 13a and a pressure is applied around the air permeable portion 13b by local deformation of the adhesive tape 13a, allowing gas to escape. Gas permeable, portion 13b when contacting liquid polymerizable composition 16 becomes gas tight. During deformation of adhesive tape 13a, portion 13b, due to its gas permeability property, allows gas bubble initially present at the top of the molding cavity to be vented out.

Once the molding cavity is completely filled and no gas remains, the mold can be handled carefully without leakages of polymerizable composition.

Then the liquid composition 16 is thereafter polymerized, at least partially, to obtain a handable lens blank.

Mold 10 can be disassembled as usual, generally leaving the duck bill valve 15 imprisoned within the polymerized composition.

The recovered lens blank can then be edge machined to eliminate the duck bill valve 15 and to obtain a finished lens having the required geometry.

What is claimed is:

1. A method for making an organic glass lens or lens blank comprising:

providing a two-piece mold defining a molding cavity having a vertical axis which is part of a fixed reference system comprising said vertical axis and a horizontal axis which intersects at the center of the mold, a liquid tight annular closure member disposed at the periphery of the mold pieces for maintaining the two mold pieces and closing the molding cavity;

filling the molding cavity from the bottom thereof with a liquid polymerizable composition;

evacuating outwardly the gas initially contained in the molding cavity;

polymerizing the liquid polymerizing composition; and disassembling the mold and recovering the molded lens or lens blank;

wherein the annular closure member comprises at the top of the molding cavity at least a portion made of a material that is initially gas permeable but becomes gas impermeable when contacted by the liquid polymerizable composition.

2. The method of claim 1, comprising:

almost totally filling the molding cavity with the composition but leaving a gas bubble at the top of the molding cavity between the liquid polymerizable composition and the annular closure member; and applying a force either on the mold or the annular closure member to increase pressure inside the molding cavity and evacuate the gas bubble from the molding cavity through the initially gas permeable portion of the annular closure member until said portion contacts the liquid polymerizable composition and becomes gas impermeable.

3. The method of claim 2, wherein the force is locally applied on the annular closure member around the initially gas permeable portion.

4. The method of claim 3, wherein the force is applied by a plunger shaped to provide a contact between the plunger and the annular closure member at the periphery of the initially gas permeable portion.

5. The method of claim 1, wherein the closure member comprises a liquid impermeable, gas impermeable portion, leaving an opening at the top of the mold cavity and a portion, initially gas permeable, but becoming gas impermeable when in contact with the liquid polymerizable composition, covering the opening.

6. The method of claim 5, wherein both portions of the closure member are adhesive tapes.

7. The method of claim 1, wherein the liquid polymerizable composition is introduced in the mold cavity through a check valve disposed at the bottom of the mold.

8. The method of claim 1, wherein the liquid polymerizable composition is a room-temperature polymerizable composition.

* * * * *